United States Patent
Lin et al.

(10) Patent No.: US 11,077,826 B2
(45) Date of Patent: Aug. 3, 2021

(54) METHOD OF PROCESSING AMBIENT RADIO FREQUENCY DATA FOR ACTIVITY RECOGNITION

(71) Applicant: Carrier Corporation, Palm Beach Gardens, FL (US)

(72) Inventors: Junyang Lin, Shanghai (CN); Zhen Jia, Shanghai (CN); Jie Xi, Shanghai (CN); Tianyuan Chen, Shanghai (CN); Yuanjing Sun, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/739,854

(22) Filed: Jan. 10, 2020

(65) Prior Publication Data

US 2020/0223393 A1 Jul. 16, 2020

(30) Foreign Application Priority Data

Jan. 11, 2019 (CN) .......................... 201910026329.8

(51) Int. Cl.
*G08B 13/18* (2006.01)
*B60R 25/10* (2013.01)
(Continued)

(52) U.S. Cl.
CPC ....... *B60R 25/1004* (2013.01); *G06N 3/0454* (2013.01); *G06N 3/084* (2013.01);
(Continued)

(58) Field of Classification Search
CPC .. B60R 25/1004; G06N 20/00; G06N 3/0454; G06N 3/084; G06T 7/20; G06T 2207/10; H04B 7/0626; H04W 24/08
(Continued)

(56) References Cited

U.S. PATENT DOCUMENTS 8,069,483 B1 * 11/2011 Matlock .............. H04W 12/126 726/23
9,378,634 B1 * 6/2016 Kashyap ................ H04B 17/20
(Continued)

FOREIGN PATENT DOCUMENTS

| CN | 105844216 A | 8/2016 |
| CN | 106131958 A | 11/2016 |
| CN | 107480699 A | 12/2017 |

OTHER PUBLICATIONS

"A Survey on Behaviour Recognition Using WiFi Channel State Information" dated Aug. 23, 2017; 8 pages.
(Continued)

*Primary Examiner* — Zhen Y Wu
(74) *Attorney, Agent, or Firm* — Cantor Colburn LLP

(57) ABSTRACT

A method of operating an activity recognition system includes capturing ambient radio frequency (RF) data by an RF sniffer. The ambient RF data is then received by a processor. The processor reduces noise content of the ambient RF data. Background is then subtracted from the ambient RF data by the processor. The processed ambient RF data is then converted into an image by the processor. The system generates successive images for each one of a plurality of time intervals. An image processing algorithm, stored in a storage medium and executed by the processor, is applied to the plurality of successive images to determine activity recognition.

10 Claims, 3 Drawing Sheets

(51) Int. Cl.
*G06N 20/00* (2019.01)
*G06N 3/04* (2006.01)
*G06N 3/08* (2006.01)
*G06T 7/20* (2017.01)
*H04B 7/06* (2006.01)
*H04W 24/08* (2009.01)

(52) U.S. Cl.
CPC .............. *G06N 20/00* (2019.01); *G06T 7/20* (2013.01); *H04B 7/0626* (2013.01); *H04W 24/08* (2013.01); *G06T 2207/10* (2013.01)

(58) Field of Classification Search
USPC ........................................................ 340/552
See application file for complete search history.

(56) References Cited

U.S. PATENT DOCUMENTS

| | | | | |
|---|---|---|---|---|
| 2004/0203910 | A1* | 10/2004 | Hind | H04W 48/04 455/456.1 |
| 2005/0259611 | A1* | 11/2005 | Bhagwat | H04L 43/00 370/328 |
| 2010/0100930 | A1* | 4/2010 | King | H04L 63/1433 726/1 |
| 2010/0105416 | A1* | 4/2010 | Nadler | H04W 52/283 455/456.4 |
| 2015/0339912 | A1* | 11/2015 | Farrand | G08B 13/02 340/501 |
| 2017/0171757 | A1* | 6/2017 | Smith | H04L 63/1425 |
| 2018/0014093 | A1* | 1/2018 | Hyde | H04Q 9/00 |
| 2018/0365975 | A1* | 12/2018 | Xu | G01V 3/12 |
| 2019/0213857 | A1* | 7/2019 | Ghourchian | G08B 25/08 |
| 2020/0223393 | A1 | 7/2020 | Lin et al. | |

OTHER PUBLICATIONS

"A Survey on Human Identification Using Wi-Fi" vol. 5 Issue VI, Jun. 2017; 6 pages.
"End-to-end Image-based Indoor Localization for Facility Operation and Management" ISARC 2018; 9 pages.
"Exploiting WiFi Channel State Information for Residential Healthcare Informatics" dated Dec. 9, 2017; 7 pages.
"Fast and accurate background subtraction for video surveillance, using an adaptive mode—tracking algorithm" dated Sep. 18, 2018; 3 pages.
"How to Improve the Signal Processing of WiFi Sensing" dated Sep. 18, 2018; https://zapdf.com/how-to-improve-the-signal-processing-of-wifi-sensing.html; 8 pages.
"Human Identification Using WiFi Signal" Submission Date Dec. 26, 2017; 57 pages.
'Indoor Human Activity Recognition Method Using Csi Of Wireless Signals'; http://doi.org/10.26480/iscsai.01.2017.49.51; 3 pages.
"Indoor Motion Detection Using Wi-Fi Channel State Information in Flat Floor Environments Versus in Staircase Environments" dated Sep. 18, 2018; 31 pages.
"Rapid A Multimodal and Device-free Approach Using Noise Estimation for Robust Person Identification" dated Sep. 2017; 27 pages.
"Robust Indoor Human Activity Recognition Using Wireless Signals" dated Sep. 18, 2018; 20 pages.
"Using Wi-Fi channel state information (CSI) for human activity recognition and fall detection" from https://open.library.ubc.ca date Issued: 2018; 4 pages.
Extended European Search Report for European Application No. 20151179.7; Date of Completion: May 25, 2020; dated Jun. 3, 2020; 32 Pages.
Gao, Q. et al. "CSI-Based Device_Frre Wireless Localization and Activity Recognition Using Radio Image Features", IEEE Transactions on Vehicular Technology, vol. 66, No. 11, Nov. 2017, pp. 10346-10356.

* cited by examiner

METHOD OF PROCESSING AMBIENT RADIO FREQUENCY DATA FOR ACTIVITY RECOGNITION

CROSS-REFERENCE TO RELATED APPLICATIONS

This application claims the benefit of Chinese Application Number 201910026329.8, filed Jan. 11, 2019, the disclosure of which is incorporated herein by reference in its entirety.

BACKGROUND

The present disclosure relates to an activity recognition system, and more particularly, to a method of processing ambient radio frequency data by the system for activity recognition.

Presence detection, intrusion detection, and other activity recognition is typically performed by motion detectors, which come in many forms including optical and thermal/infrared cameras, passive/active infrared motion detectors, acoustic sensors, vibration sensors, window magnetic sensors and/or glass break sensors. The most common motion sensor used for intrusion detection is passive infrared sensors (PIRs), which rely on sensing the heat radiated by human bodies. The PIRs may be deployed at entrance or transition points in a building through which an intruder may enter.

More recently, research and advancements have developed motion and/or presence sensing techniques that exploit changes in the radio frequency electromagnetic fields (i.e., often called RF fields) generated by wireless devices. Some systems include multiple wireless nodes/transceivers, where each node can determine changes in the signal strength and/or link quality of a specific coded or a generic RF signal received from other nodes. Decision logic, then, determines motion/presence. Other systems are based on a single transmitter and receiver to determine motion and/or presence in an area, either using a single direction measurement, or bi-directional measurements. Unfortunately, these systems rely on the deployment of specific devices for generation and sampling of the RF field. Such deployment may contribute toward deployment costs. Moreover, improvements in the preprocessing of radio frequency data streams is desirable to increase detection confidence.

BRIEF DESCRIPTION

A method of operating an activity recognition system according to one, non-limiting, exemplary embodiment of the present disclosure comprises capturing ambient radio frequency (RF) data by an RF sniffer; receiving the ambient RF data by a processor; reducing noise content of the ambient RF data by the processor; subtracting background from the ambient RF data by the processor; converting the ambient RF data with reduced noise and subtracted background into an image by the processor; generating a successive image for each one of a plurality of time intervals by the processor; and apply an image processing algorithm storing in a storage medium and executed by the processor to each successive image to determine activity recognition.

In addition to the foregoing embodiment, the noise content of the ambient RF data is reduced by removing a mean value of multiple Channel State information (CSI) subcarriers at the same time index to subtract common mode noise.

In the alternative or additionally thereto, in the foregoing embodiment, the subtracting background includes converting the ambient RF data to a first order derivative of time.

In the alternative or additionally thereto, in the foregoing embodiment, the subtracting background includes converting the ambient RF data to a first order derivative of time.

In the alternative or additionally thereto, in the foregoing embodiment, the conversion to an image includes the combination of RF data from a plurality of antenna channels.

In the alternative or additionally thereto, in the foregoing embodiment, the conversion to an image includes the combination of RF data from a plurality of antenna channels.

In the alternative or additionally thereto, in the foregoing embodiment, the plurality of time intervals is associated with characteristics of a building region containing the RF sniffer.

In the alternative or additionally thereto, in the foregoing embodiment, the image processing algorithm applies a deep learning network.

In the alternative or additionally thereto, in the foregoing embodiment, the deep learning network is a convolutional neural network (CNN).

In the alternative or additionally thereto, in the foregoing embodiment, the ambient RF data is ambient WiFi data.

In the alternative or additionally thereto, in the foregoing embodiment, the ambient WiFi data is Channel State Information (CSI) data.

A building system according to another, non-limiting, embodiment comprises a wireless radio device including a transmitting component configured to transmit a radio frequency (RF), and a receiving component configured to receive the RF to accomplish a primary task; and an activity recognition system configured to perform an activity recognition task, the activity recognition system including a sniffer configured to sample and measure ambient RF signals over time, control circuitry including one or more processors and one or more storage mediums, RF background data stored in at least one of the one or more storage mediums and indicative of no activity, a computer instruction stored in at least one of the one or more storage mediums and executed by at least one of the one or more processors, wherein the computer instruction is configured to process the measured ambient RF signals, convert the process ambient RF signals to a plurality of successive images, and apply an image-based algorithm to compare the plurality of successive images to the RF background data, and thereby determine activity recognition.

In addition to the foregoing embodiment, the transmitting device, the receiving device, and the sniffer are located in a building.

In the alternative or additionally thereto, in the foregoing embodiment, the sniffer is one of a plurality of sniffers each located in a respective region of a plurality of regions of the building.

In the alternative or additionally thereto, in the foregoing embodiment, the wireless radio device is one of a plurality of wireless radio devices each transmitting respective RF signals sampled by the sniffer.

In the alternative or additionally thereto, in the foregoing embodiment, the wireless radio device is a WiFi device.

In the alternative or additionally thereto, in the foregoing embodiment, the activity recognition system is an intruder alert system.

The foregoing features and elements may be combined in various configurations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

In the present disclosure, activity recognition detection is built on existing wireless sensors previously deployed in the building. Since radio frequency (RF) signals are increasingly available because of the penetration of wireless IoT devices, especially in indoor building automation, the present disclosure proposes to leverage the ambient RF field generated by devices that are previously deployed and not specifically for intrusion detection purposes. A decision system is presented that determines the devices that are suitable for the purposes of motion, intrusion, and/or activity recognition detection. The system is further configured to facilitate novel preprocessing of RF fields (e.g., WiFi) for improved detection confidence.

In addition, more traditional systems may entail wireless nodes deployed around an area of interest (e.g., a room or a house perimeter). However, these systems may not address the false alarm issues that arise from movements outside the area of interest. In the present disclosure, such issues are addressed by a methodology that explicitly determines the area of interest in any arbitrary deployment. Furthermore, the present disclosure incorporates a machine learning and/or neural network routine that learns the variations in the RF field corresponding to the movement within the area of interest. The machine learning and/or neural network routine, consequently, can reject false alarms caused by movements outside the area of interest.

Figure 1:
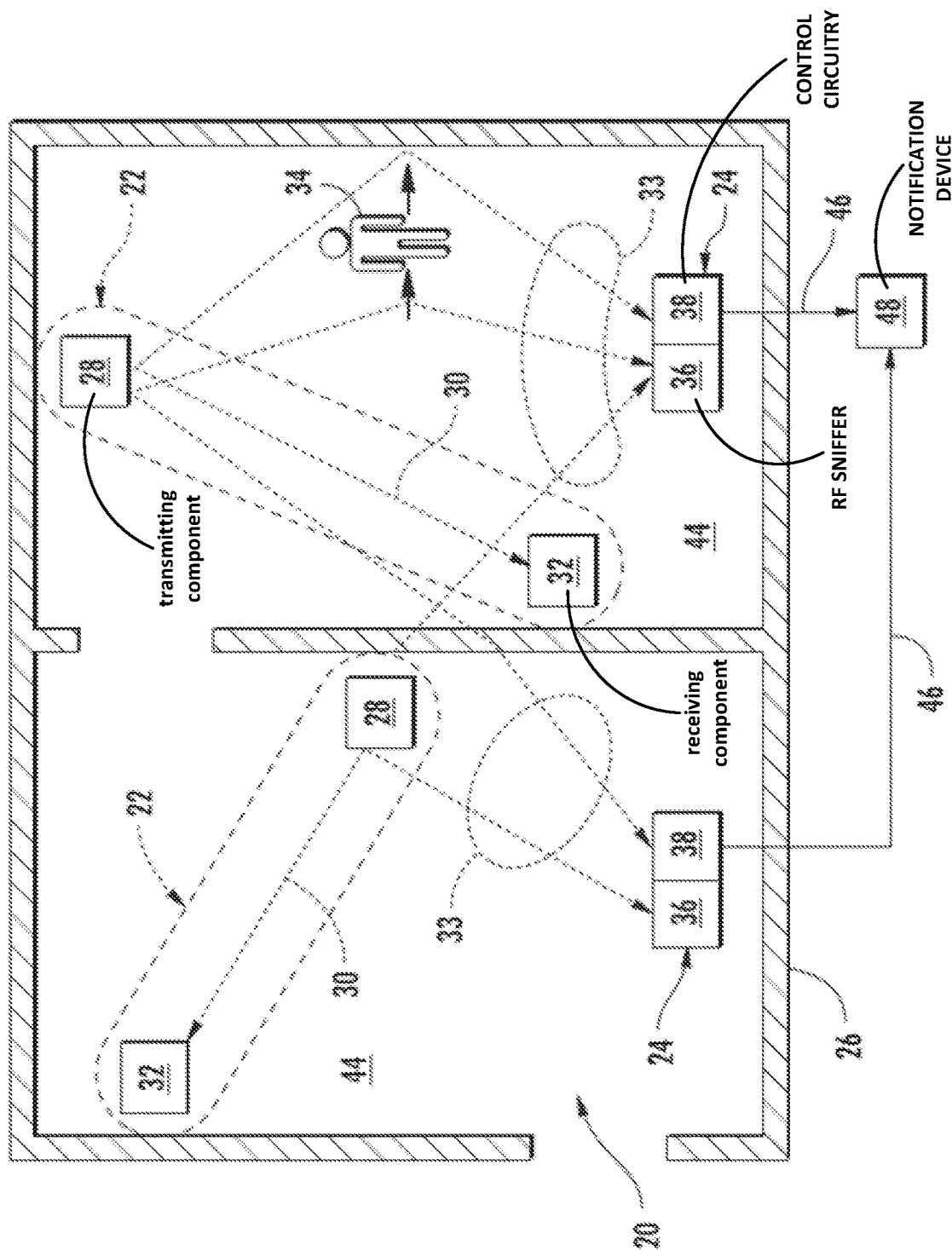
FIG. 1 is a schematic of a building system utilizing a activity recognition system as one, non-limiting, exemplary embodiment of the present disclosure.

Referring to FIG. 1, an exemplary embodiment of a building system 20 (e.g., wireless communication system) includes one or more commodity wireless radio devices, or links, 22 (i.e., two illustrated in FIG. 1) and one or more activity recognition systems 24 (i.e., two illustrated in FIG. 1) that apply radio frequency sensing. The commodity wireless radio devices 22 and the activity recognition system 24 are generally located in, or proximate too, a building 26. Each commodity wireless radio device 22 is generally stationary, and may include a transmitting component 28 configured to transmit a radio frequency (RF) signal (see arrow 30) and a receiving component 32 configured to receive the RF signal 30. Non-limiting examples of the wireless radio devices 22 and the associated RF signals 30 include WiFi devices, Zigbee devices, iBeacons, and others. Non-limiting applications of the commodity wireless radio device 22 may include a wireless phone, an entertainment system, a television system, and any other type of wireless, RF, system typically used in, or proximate too, the building 26. One, non-limiting, example of an activity recognition system 24 may be a activity recognition system.

Each respective commodity wireless radio device 22 is constructed to perform a respective primary task, and the respective RF signals 30 enable the accomplishment of such primary tasks. For example, a wireless television system may stream a movie from a transmitting component 28 (e.g., router) and to a receiving component 32 (e.g., a smart television). In another example, a telephone system may transmit verbal communications as the RF signal 30, and from a transmitting component 28 (e.g., power charger base) and to a receiving component 32 (e.g., hand-held phone). All of the RF signals 30, taken together in a given space, amount to an ambient RF signal 33 having various characteristics such as signal strength, channel state information (CSI), and others. CSI generally represents the combined effect of, for example, scattering, fading, and power decay with distance. In one embodiment, the plurality of commodity wireless radio devices 22 is a network configured to communicate in one of a mesh topology and a star topology.

The activity recognition system 24 is configured to leverage the ambient RF signal 33 by generally detecting variations in prescribed characteristics of the ambient RF signal indicative of, for example, a moving presence 34. That is, the ambient RF signal 33 is generally leveraged to serve a dual purpose, the primary task when applied to one or more of the wireless radio devices 22 (as previously described with regard to signal 32), and an activity recognition alert task when applied to the activity recognition n system 24. In one, non-limiting, example, the presence 34 may be a human intruder and the activity recognition n system 24 may be an intrusion detection system.

Figure 2:
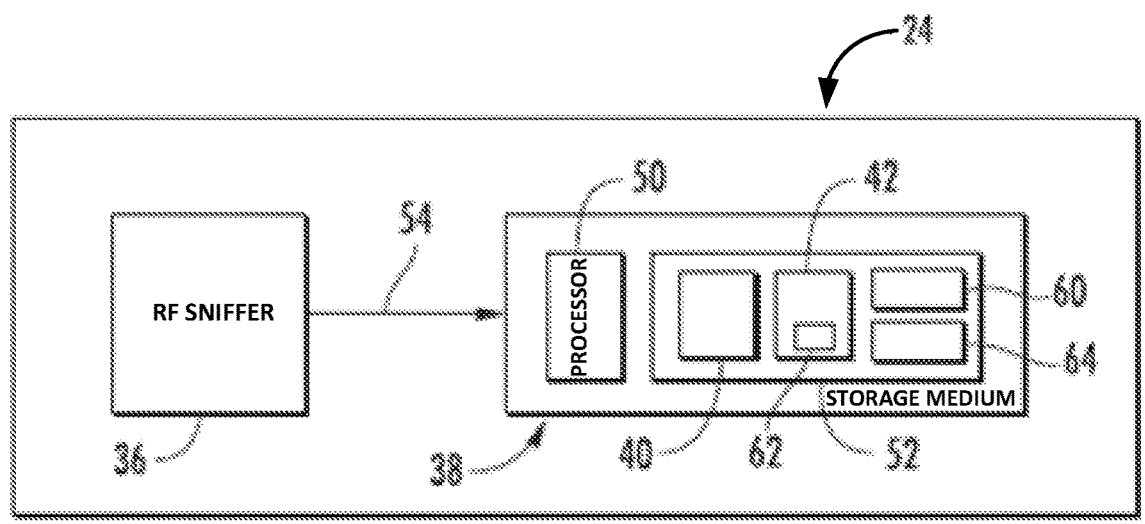
FIG. 2 is a schematic of the activity recognition system.

Referring to FIGS. 1 and 2, the activity recognition system 24 includes one or more RF sniffers 36 (i.e., two illustrated), control circuitry 38, RF data 40 (e.g., RF background data), and prescribed instructions 42 (i.e., software program). The RF sniffer 36 may be a RF device that measures physical characteristics of the received RF signal, such as signal strength, CSI, and others. Non-limiting examples of the RF sniffer 36 is a Wi-Fi network interface card, a CSI monitor, and others. Each RF sniffer 36 is located in a respective region 44 of the building 26. For example, the regions 44 may be individual rooms, or, a first region may be an area proximate to a first entry door, and a second region may be an area proximate to a second entry door of the same building 26. Each RF sniffer 36 is configured to sample and measure characteristics of the ambient RF signals 33 in the respective region 44.

It is understood, that an RF signal strength of the same RF signal 32 may be different from one region 44 to the next region due to, for example, attenuation (i.e., traveling through objects like walls) and/or distance from the transmitting component 28. The region 44 is defined and configured during the commissioning of the system. In one embodiment, the installer may traverse the corners of the region and let the RF sniffer 36 collect measurements of the characteristics of the ambient RF signal 33. This could be stored in a site-specific database and a machine learning algorithm infers if the variations in the characteristics of ambient RF signal 33 is indicative of an activity and/or a moving presence 34 that is within the configured region 44. The characteristics of the ambient RF signals 32 are further measured over time, because such measurements may differ over time depending upon, for example, the usage of the wireless radio devices 22.

In one embodiment and as illustrated in FIG. 1, the control circuitry 38 may be located in each one of the sniffers 36 as a single, self-contained, unit. In another embodiment, each sniffer 36 may communicate with a single control circuitry 38 that may be located in the building 26, or remotely located. Upon the detection of the moving presence, the control circuitry 38 may output a notification signal (see arrow 46 in FIG. 1) to a notification device 48 for notification to a user, government authority, and/or others.

The control circuitry 38 may include one or more processors 50 (e.g., microprocessor) and one or more storage mediums 52 (e.g., non-transitory storage medium) that may be computer writeable and readable. The RF data 40 and the instructions 42 are stored in the storage medium 52. In operation, the RF data 40 is used by the processor 50 along with an input signal (see arrow 54 in FIG. 2) indicative of the measured ambient RF signal 33 when executing the instructions 42 to determine the existence of the moving presence 34 within the region of interest 44. In one embodiment, the RF data 40 may include RF background data that is indicative of no moving presence. The RF background data may be learned by the processor 50 via, for example, machine learning algorithms as part of the instructions 42. The RF data may include features that allow determining if the ambient RF signal 33 is generated by a transmitting component 28 that is stationary either by matching the MAC address or by looking at the temporal variations of the RF data 40 or both. The RF data 40 may further include extracted features associated with the signal characteristics that are attributed to motion of a presence 34, which may be invariant to RF background changes (i.e., temporal variation in the ambient RF signals 33 attributed to motion).

Figure 3:
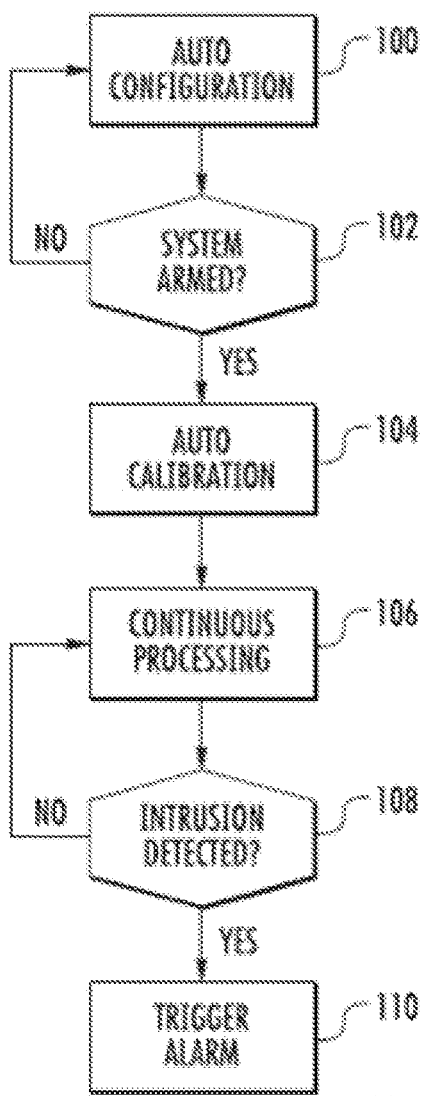
FIG. 3 is a flow chart of a method of operating the activity recognition system.

Referring to FIG. 3, and in operation, the activity recognition system 24 when initialized may be in an auto configuration at block 100. At block 102, the control circuitry 38 may determine if the system is armed. If no, the system 24 loops back to apply block 102 again. If the system is armed, and at block 104, the control circuitry 38 applies an auto calibration that entails self-learning of the RF background data and extracted features previously described. At block 106, the system 24 may continuously monitor for a moving presence 34 within the region of interest 44 by generally comparing the measured ambient RF signal 33 to the RF background data and/or extracted features stored as part of the RF data 40. At block 108, and based on this comparison, the control circuitry 38 determines if an activity (e.g., moving presence 34) is detected. If not, the system loops back to block 106. If a moving presence 34 is detected, and at block 110, the control circuitry 38 may affect the triggering of an alarm via the notification device 48.

Figure 4:
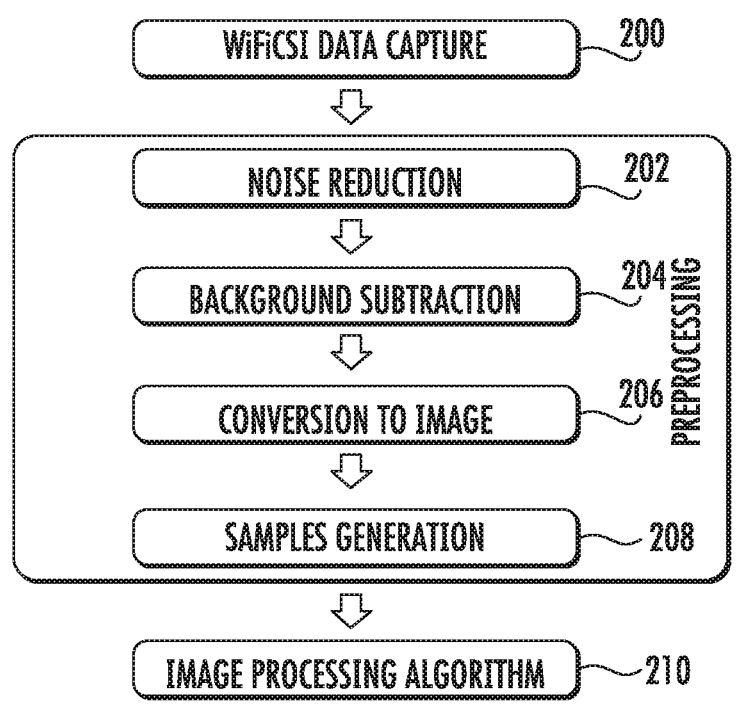
FIG. 4 is a flow chart of a method of preprocessing ambient RF signals by the system.

Referring to FIG. 4, a method of preprocessing the ambient RF signals, or data 33, before applying machine learning or other data analysis algorithms, is illustrated. At block 200, the ambient RF data 33 is captured by the RF sniffer 36 of the activity recognition system 24 and sent to the control circuitry 38 as an input signal 54 (see FIG. 2). In one example, the captured ambient RF data may be WiFi CSI data, and the RF sniffer 36 may be a CSI monitor. At block 202, noise as part of the ambient RF data 33 is reduced. In one example, this noise reduction of the data 33 is facilitated by removing a mean value of multiple CSI subcarriers at the same time index to subtract common mode noise. The operations of blocks 200 and 202 may be part of the prescribed instructions 42 stored in the storage medium 52 of the control circuitry 38, and executed by the processor 50.

At block 204, background is subtracted. In one example, subtraction of the background is facilitated by converting the ambient RF data 33 with noise reduced, to the data's first order derivative of time. This step "flattens" the environmental background data to assist in the detection of signals attributable directly to activity recognition. At block 206, the background subtracted, ambient, RF data 33 is converted to an image 60 that may be stored in the storage medium 52 (see FIG. 2). In one example, conversion to the image 60 is facilitated by the combination of data from multiple antenna channels, that is then converted into an image format. As an image, the processed ambient RF data 33 may be analyzed by image processing algorithms 62 as part of the instructions 42. In this way, the algorithms 62 may make use of the coherence between adjacent RF signal subcarriers that are typically not considered by other, more traditional, algorithms. The operations of blocks 204 and 206 may be part of the prescribed instructions 42 stored in the storage medium 52 of the control circuitry 38, and executed by the processor 50.

At block 208, a successive image 60 is generated for each one of a plurality of successive images for each one of a plurality of time intervals 64 preprogrammed and stored in the storage medium 52. The duration of each time interval 64 is established by, and associated with, characteristics of the specific building region 44 in which the ambient RF data 33 is detected. The plurality of successive images 60 facilitates use of a deep learning network for training of a shift invariant property. One example of a network is a Convolutional Neural Network (CNN). The operations of blocks 208 may be part of the prescribed instructions 42 stored in the storage medium 52 of the control circuitry 38, and executed by the processor 50. At block 210, the image processing algorithm 62 is applied to the plurality of successive images 60.

Advantages and benefits of the method for preprocessing the ambient RF signals 33 is a reduction of noise level of the ambient signals and only keeping activities information with background subtraction. Moreover, the method combines different channels into an image data format that enriches the information level in the training data to achieve optimal recognition results.

The various functions described above may be implemented or supported by a computer program that is formed from computer readable program codes and that is embodied in a computer readable medium. Computer readable program codes may include source codes, object codes, executable codes, and others. Computer readable mediums may be any type of media capable of being accessed by a computer, and may include Read Only Memory (ROM), Random Access Memory (RAM), a hard disk drive, a compact disc (CD), a digital video disc (DVD), or other forms.

Terms used herein such as component, module, system, and the like are intended to refer to a computer-related entity, either hardware, a combination of hardware and software, or software execution. By way of example, a component may be, but is not limited to, a process running on a processor, a processor, an object, an executable, a thread of execution, a program, and/or a computer. It is understood that an application running on a server and the server may be a component. One or more components may reside within a process and/or thread of execution and a component may be localized on one computer and/or distributed between two or more computers Advantages and benefits of the present discloser include an RF activity recognition system configured to sense and utilize pre-existing RF signals. Another advantage is a plug-and-play capability of the system with minimal effort by the user. Yet another advantage is the ability to compliment an already installed intrusion detection system by providing whole building coverage by leveraging the transmission used for data/voice communication.

While the present disclosure is described with reference to exemplary embodiments, it will be understood by those skilled in the art that various changes may be made and equivalents may be substituted without departing from the scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A method of operating an activity recognition system comprising:
    capturing ambient radio frequency (RF) data by an RF sniffer;
    receiving the ambient RF data by a processor;
    reducing noise content of the ambient RF data by the processor;
    subtracting background from the ambient RF data by the processor;
    converting the ambient RF data with reduced noise and subtracted background into an image by the processor;
    generating a successive image for each one of a plurality of time intervals by the processor; and
    apply an image processing algorithm storing in a storage medium and executed by the processor to each successive image to determine activity recognition, wherein the noise content of the ambient RF data is reduced by removing a mean value of multiple Channel State information (CSI) subcarriers at the same time index to subtract common mode noise.

2. A method of operating an activity recognition system comprising:
    capturing ambient radio frequency (RF) data by an RF sniffer;
    receiving the ambient RF data by a processor;
    reducing noise content of the ambient RF data by the processor;
    subtracting background from the ambient RF data by the processor;
    converting the ambient RF data with reduced noise and subtracted background into an image by the processor;
    generating a successive image for each one of a plurality of time intervals by the processor; and
    apply an image processing algorithm storing in a storage medium and executed by the processor to each successive image to determine activity recognition, wherein the subtracting background includes converting the ambient RF data to a first order derivative of time.

3. The method set forth in claim 1, wherein the subtracting background includes converting the ambient RF data to a first order derivative of time.

4. The method set forth in claim 3, wherein the conversion to an image includes the combination of RF data from a plurality of antenna channels.

5. A building system comprising:
    a wireless radio device including a transmitting component configured to transmit a radio frequency (RF), and a receiving component configured to receive the RF to accomplish a primary task; and
    an activity recognition system configured to perform an activity recognition task, the activity recognition system including a sniffer configured to sample and measure ambient RF signals over time, control circuitry including one or more processors and one or more storage mediums, RF background data stored in at least one of the one or more storage mediums and indicative of no activity, a computer instruction stored in at least one of the one or more storage mediums and executed by at least one of the one or more processors, wherein the computer instruction is configured to process the measured ambient RF signals, subtract background from ambient RF data indicative of the ambient RF signals, convert the process ambient RF signals to a plurality of successive images, and apply an image-based algorithm to compare the plurality of successive images to the RF background data, and thereby determine activity recognition, wherein the noise content of the ambient RF data is reduced by removing a mean value of multiple Channel State information (CSI) subcarriers at the same time index to subtract common mode noise.

6. The building system set forth in claim 5, wherein the transmitting component, the receiving component, and the sniffer are located in a building.

7. The building system set forth in claim 6, wherein the sniffer is one of a plurality of sniffers each located in a respective region of a plurality of regions of the building.

8. The building system set forth in claim 6, wherein the wireless radio device is one of a plurality of wireless radio devices each transmitting respective RF signals sampled by the sniffer.

9. The building system set forth in claim 5, wherein the wireless radio device is a WiFi device.

10. The building system set forth in claim 5, wherein the activity recognition system is an intruder alert system.

* * * * *